United States Patent

Yamada et al.

[11] Patent Number: 4,596,447
[45] Date of Patent: Jun. 24, 1986

[54] CONVERSION TYPE VARIFOCAL LENS SYSTEM

[75] Inventors: Yasuyuki Yamada, Tokyo; Yasuhisa Sato; Hideo Yokota, both of Kanagawa, all of Japan

[73] Assignee: Canon Kabushiki Kaisha, Tokyo, Japan

[21] Appl. No.: 715,590

[22] Filed: Mar. 25, 1985

Related U.S. Application Data

[63] Continuation of Ser. No. 447,606, Dec. 7, 1982, abandoned.

[30] Foreign Application Priority Data

Dec. 23, 1981 [JP] Japan ................................. 56-208907

[51] Int. Cl.$^4$ .................. G02B 9/34; G02B 13/18; G02B 15/02
[52] U.S. Cl. ................................... 350/422; 350/432; 350/450; 350/456; 350/469
[58] Field of Search ................. 350/422, 454–456, 350/450, 432, 469

[56] References Cited

U.S. PATENT DOCUMENTS

| 4,318,592 | 3/1982 | Tanaka | 350/422 X |
| 4,394,073 | 7/1983 | Wakamiya | 350/465 |
| 4,466,707 | 8/1984 | Ikemori et al. | 350/422 |

Primary Examiner—John K. Corbin
Assistant Examiner—Scott J. Sugarman
Attorney, Agent, or Firm—Toren, McGeady, Stanger, Goldberg & Kiel

[57] ABSTRACT

A conversion type varifocal lens system comprising a master lens which has a front assembly of positive power and a rear assembly of negative power, and a supplementary lens upon insertion into, or removal from, the space between the front and rear assemblies to change the focal length of the entire system.

12 Claims, 16 Drawing Figures

SPHERICAL ABERRATION
SINE CONDITION

ASTIGMATISM

DISTORTION (%)

SPHERICAL ABERRATION
SINE CONDITION

ASTIGMATISM

DISTORTION(%)

FIG.7
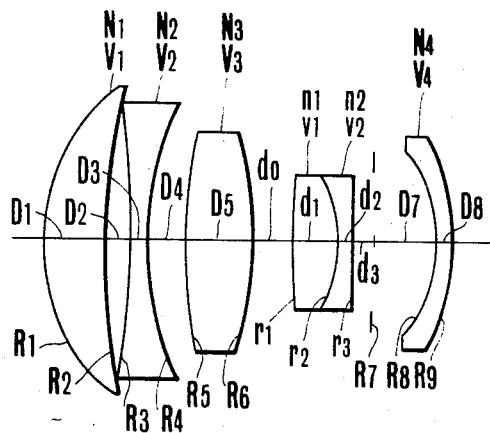
FIG.8a    FIG.8b    FIG.8c
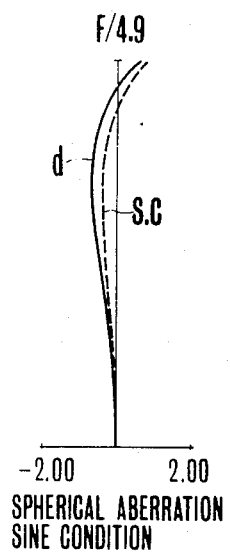
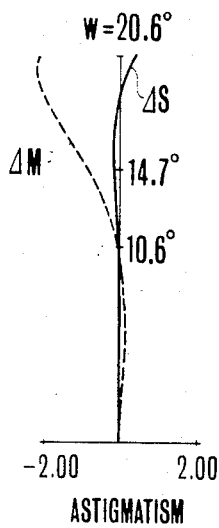
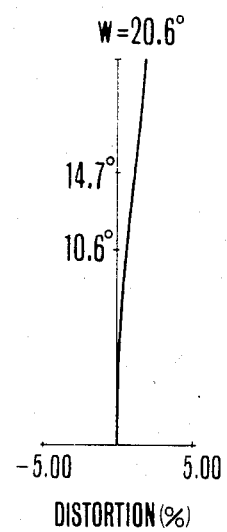

CONVERSION TYPE VARIFOCAL LENS SYSTEM

This is a continuation of application Ser. No. 447,606, filed Dec. 7, 1982 now abandoned.

BACKGROUND OF THE INVENTION

1. Field of the Invention

This invention relates to varifocal lens systems of the conversion type having discretely changed focal lengths.

2. Description of the Prior Art

In the past, in the art of 35 m/m cameras in the past various means have been proposed for allowing for discrete change of the focal length of the lens system to perform while still maintaining the compact state of the lens system. In U.S. Pat. No. 3,388,650, the method of changing the magnification power proposed therein is by inserting a supplementary lens into the space between the master lens system and the image plane and by moving the master lens system entirely. Another proposal in Japanese Laid-Open Patent No. Sho 54-97423 is that a supplementary lens of 6-component lens form takes its place in the rear of the master lens system with change of the magnification power. These supplementary lenses are, however, large, and cannot be said to be suited for minimization of the bulk and size of the entire lens system.

Further, for distance of the use of the supplementary lens constituting part of a lens system having changed focal lengths, mention may be made of U.S. Pat. No. 4,318,592.

SUMMARY OF THE INVENTION

An object of the present invention is to provide a method which is different from any of the conventional ones which enables changing of the focal length of a lens system in two or more discrete values while still stabilizing the image plane against shift.

Another object of the present invention is to provide a lens system of compact form which is excellent in the magnification power changing effect and well corrected for all aberrations even at changed magnifications.

To achieve the objects of the present invention, a lens system should have a feature such that a front lens assembly of positive power and a rear lens assembly of negative power which constitute a master lens system are separated from each other by an air space in which a supplementary lens system of negative power is releasably attached in axial alignment to the master lens system, so as to thereby change the focal length of the entire system.

What is to be considered in connection with the construction of the master lens system from the positive front and negative rear assemblies as in the lens system of the present invention is that with the diaphragm mechanism, shutter mechanism and the like when positioned between the said front and said rear assemblies, if the use of the supplementary lens system requires a shift of the diaphragm or the rear assembly, the mechanical structure will be made objectionably complicated.

For this reason, in the present invention, the form and arrangement and construction of the lens components which constitute the master lens system with the supplementary lens inserted into the space between the front and rear assemblies are made to leave the positional relationship between the diaphragm mechanism and the rear assembly to the focal plane unchanged during changing of the focal length.

BRIEF DESCRIPTION OF THE DRAWINGS

FIG. 7 and FIGS. 8-*a* to *c* are a lens block diagram of the second embodiment of the invention including another supplementary lens attached to the master lens system of FIG. 5 and graphic representations of the aberrations thereof with an object at infinity respectively.

DETAILED DESCRIPTION OF THE PREFERRED EMBODIMENTS

Figure 1:
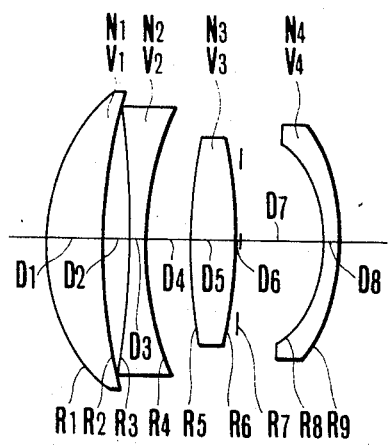
FIG. 1 and FIGS. 2-*a* to *c* are a lens block diagram of a first embodiment of a master lens system according to the present invention and graphic representations of the aberrations of the system with an object at infinity respectively.
Figure 2A:
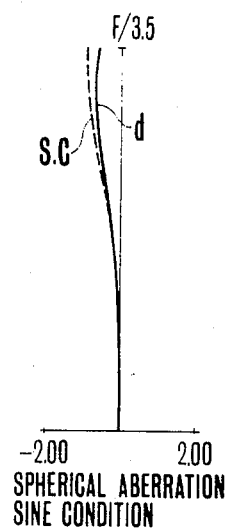
Figure 2B:
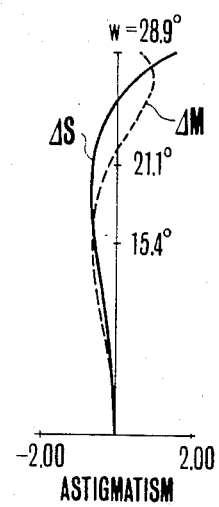
Figure 2C:
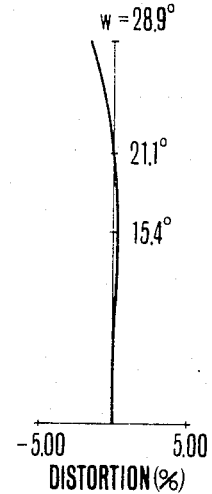
Figure 3:
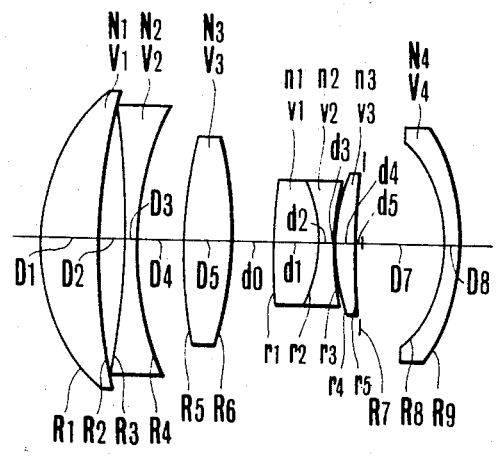
FIG. 3 and FIGS. 4-*a* to *c* are a lens block diagram of the first embodiment of the invention including a supplementary lens attached to the master lens system of FIG. 1 and graphic representations of the aberrations thereof with an object at infinity respectively.
Figures 4A, 4B, 4C:
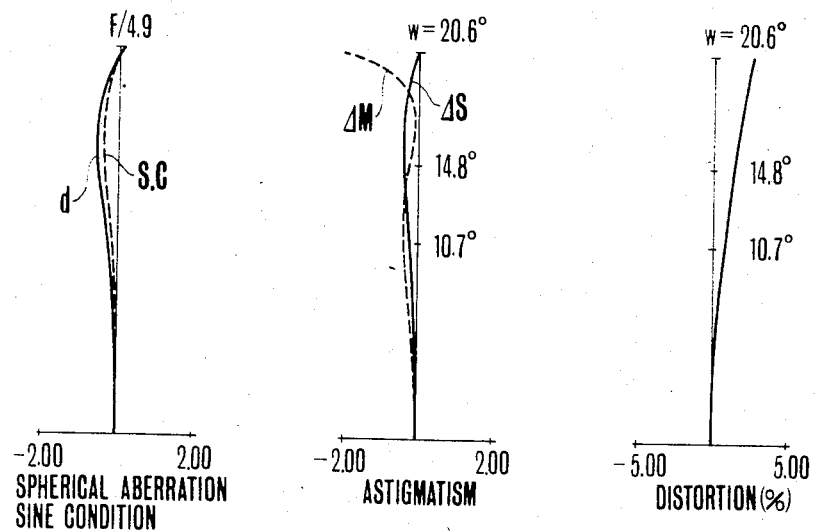
Figure 5:
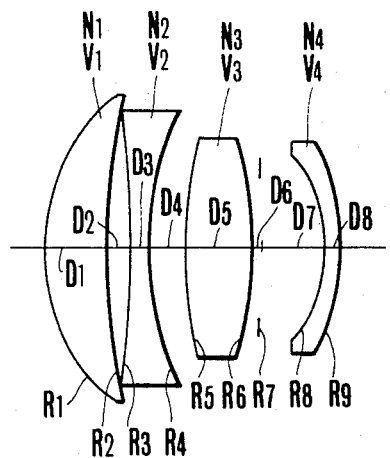
FIG. 5 and FIGS. 6-*a* to *c* are a lens block diagram of a second embodiment of the master lens system according to the present invention and graphic representations of the aberrations thereof with an object at infinity respectively.
Figure 6A:
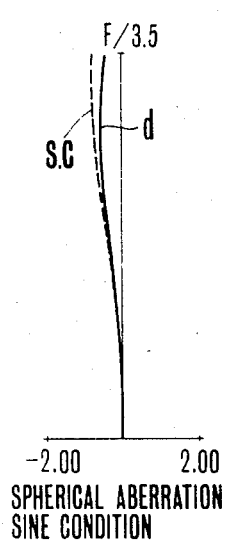
Figure 6B:
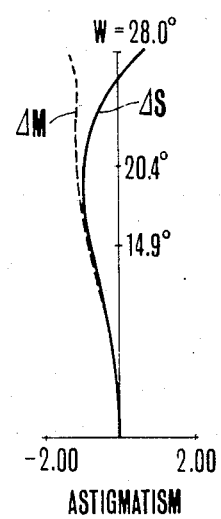
Figure 6C:
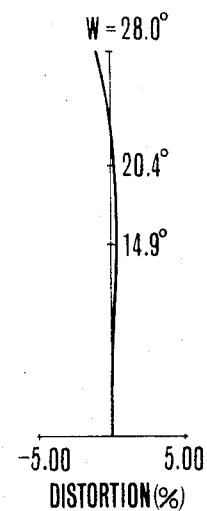

The master lens system according to the present invention has the telephoto type configuration with the front assembly of positive power and the rear assembly of negative power to shorten the total length (the distance from the front vertex of the 1st lens element to the focal plane). Further, the telephoto type of lens system is generally not suited for increasing the field angle. This is because the distortion and astigmatism tend to increase with increase in the field angle, and it becomes difficult to correct these aberrations. In the present invention, therefore, in order to employ the telephoto type so as to increase the angular field, the front assembly is constructed with, from front to rear, a positive meniscus 1st lens component of forward convexity, a negative 2nd lens component and a positive 3rd lens component, and the rear assembly with a negative meniscus 4th lens component of forward concavity. With such construction and arrangement of the constituent lenses, it is made possible to achieve good correction of aberrations over the extended angular field. Further, a diaphragm is positioned between the front and rear assemblies. Then, after the front assembly has been moved forward, the supplementary lens of negative power is inserted into the air space between the front and rear assemblies in axial alignment to the master lens system, thereby the focal length of the entire lens system is changed. Thus, the aberration variations resulting from the change of the focal length are suppressed within ranges as small as possible so that high grade optical performance can be preserved. It should be pointed out here that the front and rear assemblies may both be moved forward in such relation so as to provide an increasing air space therebetween into which the supplementary lens is then inserted and that, if the air space between the front and rear assemblies is initially long enough to accommodate the supplementary lens, they may be moved forward as a unit when the supplementary lens is in use. The supplementary lens herein used has, despite the change of the focal length, the ability to preserve good correction of aberrations, especially of off-axis aberrations and chromatic aberrations, and is constructed in the form of at least one positive lens and at least one negative lens. In the specific embodiments to be described later, the supplementary lens is configured to such a refractive power distribution that the positions of the diaphragm mechanism and the rear assembly are maintained constant relative to the focal plane.

In order to achieve a further improvement of the correction of aberrations of the varifocal lens system of the invention, it is preferred to make the front surface of the 4th lens component aspheric. The aspheric surface is preferably specified in the numerical data to be given below for the practical embodiments where using a co-ordinate of the X-axis in an optical axis and the Y-axis in a direction perpendicular to the optical axis with the intersection of the vertex and X-axis at an original point and taking the direction in which light advances as positive, an equation for the aspheric surface is defined by the difference $\Delta X$ between the front or aspheric surface of the 4th component and a spherical surface which contributes to the determination of the focal length in the direction of the X-axis:

$$\Delta X = \frac{(1/R^*)Y^2}{1 + \sqrt{1 - (Y/R^*)^2}} + a1Y^2 + a2Y^4 + a3Y^6 + \ldots +$$

$$b1Y^3 + b2Y^5 + \ldots - \frac{(1/R)Y^2}{1 + \sqrt{1 - (Y/R)^2}}$$

where R is the radius of curvature of the paraxial region of the front surface of the 4th component; $R^*$ is the radius of curvature of the reference spherical surface defined by $R = 1/(1/R^* + 2a1)$; and $ai$ and $bi$ are the aspheric even and odd coefficients respectively.

Focusing of the conversion type varifocal lens system of the invention with the exclusion of the supplementary lens may be performed either by bodily moving the master lens system, or by moving the front assembly alone. As to the inclusion of the supplementary lens, the entire lens system may be moved as a unit, or the front assembly only may be moved, or the front assembly and the supplementary lens system may be moved as a unit, or the supplementary lens system only may be moved. Though the supplementary lens system for use in the present invention is generally built into the camera, it is also possible to otherwise arrange it as is interchangeable from the outside of the camera. Further, two or more different supplementary lens systems may be built into a common camera as far as space permits, thereby the number of changed focal length values is increased.

The present invention has the foregoing features which give greatly improved results with respect to the advance in compactness and the stabilization of high grade imaging performance against the change of focal length, when these features fall within the specified ranges.

Next, examples of specific lens system with and without supplementary lenses can be constructed in accordance with the following numerical data related to the master lens system for the radii of curvature, R, the axial thicknesses and air separations, D, and the refractive indices, N, and the Abbe numbers, V, of the glasses of the lens elements with subscripts numbered consecutively from front to rear, and with those related to the supplementary lens system for, similarly to the master lens system, radii of curvature, r, the axial thicknesses and air separations, d, and the refractive indices, n, and the Abbe numbers, $v$, of the glasses of the lens elements with subscripts numbered consecutively from front to rear.

It is noted that d0 is the axial air separation between the front assembly of the master lens system and the supplementary lens system, and d5 in numerical example 1-2, d3 in numerical example 2-2, and D6 and D7 are the axial air separations between the respective lenses and the diaphragm.

It is also noted that R7 is the diaphragm.

The numerical data of specific example 1 of the master lens system are listed below:

SPECIFIC EXAMPLE 1-1

| $f = 100$ | F/3.5 | $2\omega = 57.7°$ | Back Focus = 52.392 |
|---|---|---|---|
| R1 = 30.98 | | | |
| | D1 = 9.79 | N1 = 1.77250 | V1 = 49.60 |
| R2 = 90.10 | | | |
| | D2 = 4.12 | | |
| R3 = −148.21 | | | |
| | D3 = 2.54 | N2 = 1.80518 | V2 = 25.40 |
| R4 = 48.14 | | | |
| | D4 = 8.16 | | |
| R5 = 87.26 | | | |
| | D5 = 7.69 | N3 = 1.70154 | V3 = 41.20 |
| R6 = −66.72 | | | |
| | D6 = 0.51 | | |
| R7 = (Stop) | | | |
| | D7 = 14.23 | | |
| R8* = −21.66 | | | |
| | D8 = 2.54 | N4 = 1.49171 | V4 = 57.40 |
| R9 = −33.53 | | | |

R8*: Aspheric Surface
A1 = 0
A2 = 0.30483 × 10$^{-5}$
A3 = −0.32473 × 10$^{-7}$
A4 = 0.20886 × 10$^{-9}$
A5 = 0.39298 × 10$^{-13}$
B1 = −0.18634 × 10$^{-4}$
B2 = 0.39056 × 10$^{-6}$
B3 = −0.10389 × 10$^{-8}$
B4 = −0.76774 × 10$^{-11}$ The numerical data of specific example 1 of the master lens system with the inclusion of the supplementary lens are listed below.

SPECIFIC EXAMPLE 1-2

| $f = 146.522$ | F/4.9 | $2\omega = 41.2°$ | Back Focus: 52.392 |
|---|---|---|---|
| R1 = 30.98 | | | |
| | D1 = 9.79 | N1 = 1.77250 | V1 = 49.60 |
| R2 = 90.10 | | | |
| | D2 = 4.12 | | |
| R3 = −148.21 | | | |
| | D3 = 2.54 | N2 = 1.80518 | V2 = 25.40 |
| R4 = 48.14 | | | |
| | D4 = 8.16 | | |
| R5 = 87.26 | | | |
| | D5 = 7.69 | N3 = 1.70154 | V3 = 41.20 |
| R6 = −66.72 | | | |
| | d0 = 7.65 | | |
| r1 = 131.00 | | | |
| | d1 = 7.47 | n1 = 1.59270 | $v$1 = 35.30 |
| r2 = −21.41 | | | |
| | d2 = 2.54 | n2 = 1.80400 | $v$2 = 46.60 |
| r3 = 51.83 | | | |
| | d3 = 0.25 | | |
| r4 = 35.62 | | | |
| | d4 = 3.22 | n3 = 1.49831 | $v$3 = 65.00 |
| r5 = 220.05 | | | |
| | d5 = 0.89 | | |
| R7 = (Stop) | | | |
| | D7 = 14.23 | | |
| R8* = −21.66 | | | |
| | D8 = 2.54 | N4 = 1.49171 | V4 = 57.40 |

-continued

| $f = 146.522$ | F/4.9 | $2\omega = 41.2°$ | Back Focus: 52.392 |

R9 = −33.536

R8*: Aspheric Surface
A1 = 0
A2 = 0.30483 × $10^{-5}$
A3 = −0.32473 × $10^{-7}$
A4 = 0.20886 × $10^{-9}$
A5 = 0.39298 × $10^{-13}$
B1 = −0.18634 × $10^{-4}$
B2 = 0.39056 × $10^{-6}$
B3 = −0.10389 × $10^{-8}$
B4 = −0.76774 × $10^{-11}$ The numerical data of specific example 2 of the master lens system are listed below.

SPECIFIC EXAMPLE 2-1

| $f = 100$ | F/3.5 | $2\omega = 55.9°$ | | Back Focus: 53.099 |
|---|---|---|---|---|
| R1 = 31.20 | | | | |
| | D1 = 10.15 | N1 = 1.77250 | V1 = 49.60 | |
| R2 = 99.31 | | | | |
| | D2 = 4.55 | | | |
| R3 = −149.50 | | | | |
| | D3 = 2.45 | N2 = 1.80518 | V2 = 25.40 | |
| R4 = 44.54 | | | | |
| | D4 = 6.91 | | | |
| R5 = 87.02 | | | | |
| | D5 = 10.96 | N3 = 1.70154 | V3 = 41.20 | |
| R6 = −61.93 | | | | |
| | D6 = 1.29 | | | |
| R7 = (Stop) | | | | |
| | D7 = 11.19 | | | |
| R8* = −21.60 | | | | |
| | D8 = 2.45 | N4 = 1.49171 | V4 = 57.40 | |
| R9 = −33.69 | | | | |

R8*: Aspheric Surface
A1 = 0.24534 × $10^{-4}$
A2 = 0.15472 × $10^{-5}$
A3 = −0.57912 × $10^{-7}$
A4 = 0.27329 × $10^{-9}$
A5 = −0.10822 × $10^{-12}$
B1 = 0.37886 × $10^{-5}$
B2 = 0.43182 × $10^{-6}$
B3 = 0.20033 × $10^{-8}$
B4 = −0.11801 × $10^{-10}$ The numerical data of specific example 2 of the master lens system with the inclusion of the supplementary lens are listed below:

SPECIFIC EXAMPLE 2-2

| $f = 141.201$ | F/4.9 | $2\omega = 41.2°$ | | Back Focus: 53.099 |
|---|---|---|---|---|
| R1 = 31.20 | | | | |
| | D1 = 10.15 | N1 = 1.77250 | V1 = 49.60 | |
| R2 = 99.31 | | | | |
| | D2 = 4.55 | | | |
| R3 = −149.50 | | | | |
| | D3 = 2.45 | N2 = 1.80518 | V2 = 25.40 | |
| R4 = 44.54 | | | | |
| | D4 = 6.91 | | | |
| R5 = 87.02 | | | | |
| | D5 = 10.96 | N3 = 1.70154 | V3 = 41.20 | |
| R6 = −61.93 | | | | |
| | d0 = 7.45 | | | |
| r1 = 339.45 | | | | |
| | d1 = 7.11 | n1 = 1.59270 | ν1 = 35.30 | |
| r2 = −20.71 | | | | |
| | d2 = 2.45 | n2 = 1.80400 | ν2 = 46.60 | |
| r3 = −1866.87 | | | | |
| | d3 = 3.10 | | | |
| R7 = (Stop) | | | | |
| | D7 = 11.19 | | | |
| R8* = −21.60 | | | | |
| | D8 = 2.45 | N4 = 1.49171 | V4 = 57.40 | |

-continued

| $f = 141.201$ | F/4.9 | $2\omega = 41.2°$ | Back Focus: 53.099 |

R9 = −33.69

R8*: Aspheric Surface
A1 = 0.24534 × $10^{-4}$
A2 = 0.15472 × $10^{-5}$
A3 = −0.57912 × $10^{-7}$
A4 = 0.27239 × $10^{-9}$
A5 = −0.10822 × $10^{-12}$
B1 = 0.37886 × $10^{-5}$
B2 = 0.43182 × $10^{-6}$
B3 = 0.20033 × $10^{-8}$
B4 = −0.11801 × $10^{-10}$

What we claim:

1. A conversion type varifocal lens system comprising:
    a master lens consisting of a front positive lens assembly and a rear negative lens assembly, said master lens for performing the photography and;
    a supplementary negative lens component arranged to be inserted into and retracted from a space between said front and rear assemblies, whereby when said supplementary component advances into the space between said front and rear assemblies, said front assembly is moved forward.

2. A conversion type varifocal lens system comprising:
    a master lens consisting of a front positive lens assembly and a rear negative lens assembly;
    a supplementary negative lens component arranged to be inserted into and retracted from a space between said front and rear assemblies, whereby when said supplementary component advances into the space between said front and rear assemblies, said front assembly is moved forward, and wherein said front assembly consists of, from front to rear, a meniscus-shaped positive first lens of forward convexity, a negative second lens and a positive third lens, and said rear assembly consists of a meniscus-shaped negative fourth lens of forward concavity.

3. A lens system according to claim 2, wherein the front surface of said fourth lens is aspherical.

4. A lens system according to claim 3, wherein said supplementary component consists of a positive lens and a negative lens.

5. A lens system according to claim 4, wherein said front component moves when focusing.

6. A lens system according to claim 4, wherein said supplementary component moves when focusing.

7. A conversion type varifocal lens system comprising:
    a stop;
    a master lens consisting of a front positive lens assembly and a rear negative lens assembly, said master lens for performing the photography; and
    a supplementary negative lens component arranged to be inserted into and retracted from a space between said front and rear assemblies,
    whereby when said supplementary component advances into the space between said front and rear assemblies, said front assembly is moved forward.

8. A conversion type varifocal lens system comprising:
    a stop;
    a master lens consisting of a front positive lens assembly and a rear negative lens assembly; and a supplementary negative lens component arranged to be inserted into and retracted from a space between said front and rear assemblies, whereby when said supplementary components advance into the space between said front and rear assemblies, said front assembly is moved forward, and wherein said front assembly consists of, from front to rear, a meniscus-shaped positive first lens of forward convexity, a negative second lens and a positive third lens, and said rear assembly consists of a meniscus-shaped negative fourth lens of forward concavity.

9. A lens system according to claim 8, wherein the front surface of said fourth lens is aspherical.

10. A lens system according to claim 9, wherein said supplementary component consists of a positive lens and a negative lens.

11. A lens system according to claim 10, wherein said front component moves when focusing.

12. A lens system according to claim 10, wherein said supplementary component moves when focusing.